Patented Jan. 9, 1940

2,186,095

UNITED STATES PATENT OFFICE 2,186,095

PIGMENT PROCESS

James E. Booge, Wilmington, Del., and Charles F. Oppermann, Newark, N. J., assignors to E. I. du Pont de Nemours & Company, Wilmington, Del., a corporation of Delaware No Drawing. Application August 11, 1937, Serial No. 158,508

7 Claims. (Cl. 134—78)

This invention relates to improvements in the manufacture of zinc sulfide containing pigments. More particularly it relates to the grinding of zinc sulfide containing pigments. Still more particularly it relates to the production of zinc sulfide containing pigments which possess improved fineness and dispersion characteristics.

In the manufacture of lithopone and other zinc sulfide containing pigments it is customary to grind the calcined product. This grinding usually includes both wet and dry grinding processes. A substantial improvement in wet milling of lithopone is disclosed in U. S. Patent 1,826,131. This process comprises a continuous grinding and hydroseparation circuit in which the calcined zinc sulfide containing pigment is ground and dispersed in aqueous media with the aid of sodium silicate, the fines are separated from the coarse by hydroseparation and the coarse are reground. This process is an improvement over prior processes and is used for the production of high quality pigments. However, in spite of the improvements that were made over the prior art it was found that there were still many difficulties present. For instance when sodium silicate is used as a dispersing agent there is the danger of contamination by hydrous silica compounds which causes cementation during the pigment drying. This results in the presence of gritty pigment particles in the paint films unless the paint is subjected to long and expensive grinding. Also, at times the prior art grinding suspensions were found to be in a rather poor state of dispersion due to the fact that the dispersing power of the reagents was not extremely high. Undesirably large proportions of silicate were often required for good dispersion. The consequence of this was that zinc sulfide containing pigments resulting from a process utilizing alkali silicate as the dispersing agent were found to contain objectionable grit and additionally paints prepared therefrom tended to show a characteristic water sensitivity.

Water sensitivity manifests itself by more difficult wetting of the pigment with the paint vehicle, particularly when the relative humidity is high. Also, it is found that paints prepared from water sensitive pigments thicken, sometimes to a plastic mass, when water or soap solution is added to the paint.

This invention has as an object the improvement of the wet grinding of zinc sulfide containing pigments. A further object is the production of grinding suspensions in a more highly dispersed state. A still further object is the production of zinc sulfide containing pigments in a fine state of subdivision and readily incorporable in enamel vehicles. A still further object is the control of water sensitivity. Additional objects will become apparent from a consideration of the following description and claims.

These objects are attained according to the herein described invention which broadly comprises conducting the wet grinding process in the presence of a small amount of phosphoric acid or its salts. In a more restricted sense this invention comprises conducting the wet grinding process in the presence of between about .05% and about 0.5% of an alkali metal pyrophosphate. The preferred embodiment of this invention comprises conducting the wet grinding process in the presence of between about 0.1% and about 0.2% of sodium pyrophosphate.

The figures given above relate to the relative amounts of the anhydrous salt and of the dry pigment.

While the advantages of my invention may be realized by application to any aqueous system in which zinc sulfide containing pigments are ground, we prefer to grind the pigment in a continuous closed circuit wet grinding system with hydroseparation using sodium pyrophosphate as the dispersing agent. The agent is added either as a continuous stream of a dry powder or as a solution of the salt in water, preferably along with the pigment and water entering the grinding system.

Various arrangements and selections of equipment for the operation of our process are possible. We prefer however, to use a Dorr hydroseparator as the means of effecting the separation of fines from the coarse due to the ease with which it can be operated. In the preferred set up of equipment, we feed an aqueous suspension of unground pigment containing about 10 parts by weight of water to 1 part by weight of pigment to a continuous ball or tube mill which is fed by either a pipe extending into the end of the mill or by a scoop feeder. In passing through the mill the product is ground and the mill discharge is continuously fed into the hydroseparator. The fines are overflowed and the coarse returned to the ball mill where it is thoroughly distributed in the aqueous dispersion. The hydroseparator overflow is led into a coagulating tank where it is treated with a coagulating agent such as sulfuric acid or the salt of a bivalent or trivalent metal. The slurry thus produced is then dewatered by filtration or the equivalent thereof and dried in the usual manner well known in the art.

Some calcined lithopone pigments are more easily ground than others due to the different calcination conditions as well as the frit content, conditions of precipitation, etc., and when grinding the softer pigments we sometimes prefer to add the pyrophosphate reagent to the water suspension of the quench pigment and run the same into the hydroseparator tank without passing through the ball mill. The latter is then used to grind only the underflow from the hydroseparator. The mill discharge is returned to this tank as in the other equipment combination. The hydroseparator overflow can then be treated with a coagulant and dewatered as mentioned above.

To examine for dispersion (or absence of flocculates) we use a very simple test. A sample of the pigment suspension is placed in a glass tube having a diameter of 20 to 30 millimeters and the tube examined by aid of a high intensity microscope lamp and a 10-15 power magnifying glass. Flocculates can be observed under such conditions even when present to only a small extent. This test was useful in demonstrating the improved results obtained by substituting the pyrophosphate for the silicate reagent.

The following examples are given for illustrative purposes only and are not intended to place any restrictions on the herein described invention.

Example I

A suspension of lithopone in water was produced containing about 100 grams of lithopone per liter and using a wet quenched calcined product. A 10% sodium pyrophosphate solution was added in an amount sufficient to give .20 part of $Na_4P_2O_7$ per 100 parts of lithopone and after the addition, the dispersed slurry was examined for flocculates. The fine particles were well dispersed (no flocculates present) while the coarser fraction of this unground pigment settled through the fine dispersion on standing. It was found to be well suited for the elutriation process of U. S. Patent 1,826,131 and the overflow when collected, flocculated by $H_2SO_4$, dried and ground in an enamel vehicle gave films of excellent texture.

Example II

An unground lithopone slurry containing about 10 parts by weight of lithopone to 90 parts by weight of water was fed into a continuous ball mill and the mill discharge collected in an agitated tank. A solution of sodium pyrophosphate in an amount equal to .18 part by weight of $Na_4P_2O_7$ per 100 parts by weight of pigment was added to the ground suspension thereby causing complete dispersion of the individual particles. The product was fed continuously into a Dorr hydroseparator where the fine particles were separated from the coarse. The latter was returned to the ball mill for further grinding and the operation carried out in a continuous manner.

Example III

The operation of Example II was repeated using a mixture of sodium pyrophosphate and sodium silicate. One-tenth part by weight of the former and .5 part by weight of a 34° Bé. sodium silicate solution were used per 100 parts lithopone. The dispersion while not perfect was quite satisfactory for hydroseparation.

It is to be understood that the disclosed specific embodiments of our invention may be subjected to variation and modification without departing from the scope of this invention. For instance, our pyrophosphate reagent is also capable of being used in conjunction with sodium silicate. It can be used to replace all or only a portion of the silicate as used in the prior art and such operation is considered a part of this invention. When it is desired to produce a pigment of controlled water sensitivity the use of pyrophosphate in conjunction with silicate is particularly advantageous. In such instance water sensitivity is controlled at the desired level (the paint made from such pigment thickens to the desired extent on addition of the specified amount of water) by maintaining the proportion of silicate to pigment constant while varying the amount of pyrophosphate as required for complete dispersion. However, it is preferred to use the pyrophosphate alone and not in conjunction with sodium silicate.

The amount of dispersing agent required by a given zinc sulfide containing pigment can best be learned by experimental trial and the amount will vary with the ZnO, CaO, and MgO content of the pigment. In the case of sodium silicate an amount substantially in excess of 1% is sometimes necessary. However, by the use of a pyrophosphate salt we are able to obtain satisfactory dispersion with amounts as low as .05% since it is a much more effective reagent. Only very seldom is it necessary to use more than .50% of the agent. The use of about .1% to .2% is satisfactory with the average lithopone whereas the same pigment may require ten times as much sodium silicate. Although sodium pyrophosphate is the preferred salt it is to be understood that other alkali pyrophosphate salts may also be used without departing from the scope of this invention. Since the anhydrous salt is more economical than the hydrated salt, we prefer to use the anhydrous salt although equally beneficial results are obtained with the hydrated pyrophosphates.

The product of our process possesses other properties not previously combined in a single pigment. It is exceedingly fine since excellent separation of fines and coarse are possible due to the high dispersing power of the reagent. By its use, the hydroseparator is practically void of flocculates insuring the highest quality from the standpoint of a uniformly fine pigment. Furthermore, there is no danger of contamination by hydrous silica compounds which tend to cause more or less cementation during the pigment drying as in the case with the prior art reagent. Our product will therefore produce paint films which are free of gritty pigment particles with less paint grinding than the prior art pigments.

Our product is also more easily wetted by the oil and this simplifies the mixing operation prior to the actual paint grinding. This likewise results in substantial savings to the pigment consumer. Our pigment is unique in the rapidity with which it mixes with the oil and becomes a relatively fluid mass. In some instances, as for example, in inside flat paints, we are able to produce a reasonably good paint by a simple mixing operation, thereby eliminating the cost of paint grinding.

Of particular importance is the fact that we may control our product entirely free of water sensitivity or we may control its water sensitivity at a definite predetermined level. As is well known, many flat paints are improved in working properties and in suspension by addition of small amounts of water or soap solution. In such instances a certain amount of thickening of the paint ensues. If too much silicate is employed in a pigment such thickening becomes excessive. The use of pyrophosphate in conjunction with lesser amounts of silicate permits obtainment of any desired degree of water sensitivity.

As many apparently widely different embodiments of this invention may be made without departing from the spirit and scope thereof, it is to be understood that the invention is not limited to the specific embodiments thereof except as defined in the appended claims.

Having disclosed the present invention, the following is claimed as new and useful:

1. In a process for the separation of finely divided zinc sulfide containing pigments in aqueous suspension from coarser particles by wet grinding, the step which comprises adding a small amount of an alkali metal pyrophosphate.

2. In a process for the separation of finely divided zinc sulfide containing pigments in aqueous suspension from coarser particles by wet grinding, the step which comprises adding between about .05% to about 0.5% of sodium pyrophosphate.

3. In a process for the separation of finely divided zinc sulfide containing pigments in aqueous suspension from coarser particles by wet grinding, the step which comprises adding between about 0.1% to about 0.2% of sodium pyrophosphate.

4. In a cyclic process for the wet grinding of zinc sulfide pigments the steps which comprise grinding an aqueous suspension of the pigment in the presence of an alkali metal pyrophosphate, hydroseparating the fines, and returning the coarser fraction to the mill for further grinding.

5. In a closed circuit wet grinding system the step which comprises hydroseparating an aqueous suspension of a zinc sulfide containing pigment in the presence of a small amount of an akali metal pyrophosphate.

6. In a closed circuit wet grinding system the step which comprises hydroseparating an aqueous suspension of a zinc sulfide containing pigment in the presence of between about .05% to about 0.5% of a sodium pyrophosphate.

7. In a closed circuit wet grinding system the step which comprises hydroseparating an aqueous suspension of a zinc sulfide containing pigment in the presence of between about 0.1% to about 0.2% of a sodium pyrophosphate.

JAMES E. BOOGE.
CHARLES F. OPPERMANN.